UNITED STATES PATENT OFFICE.

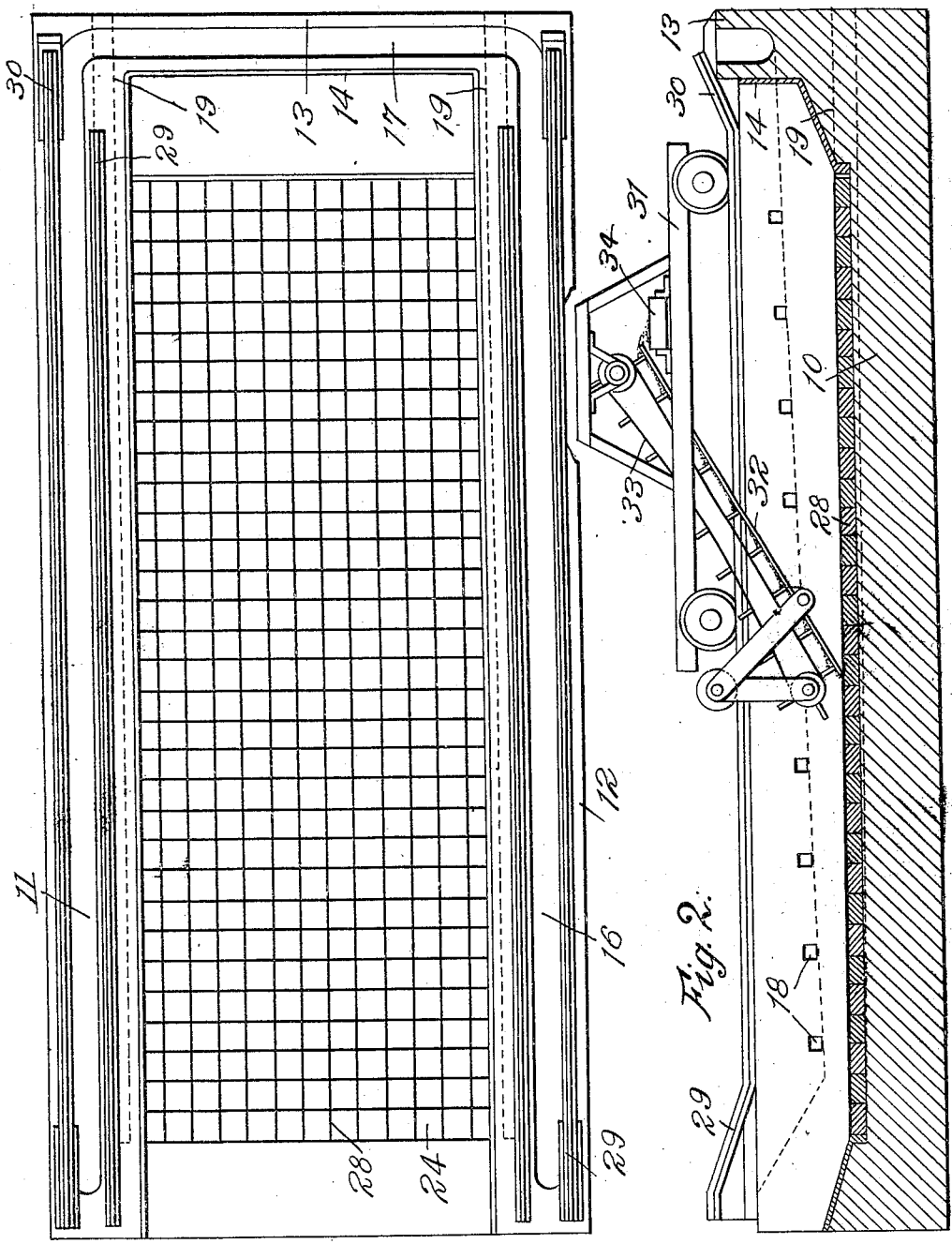

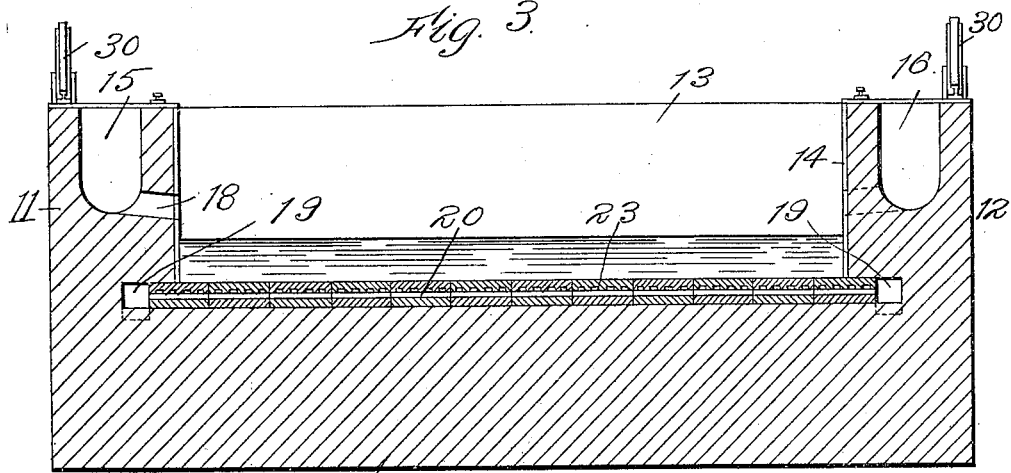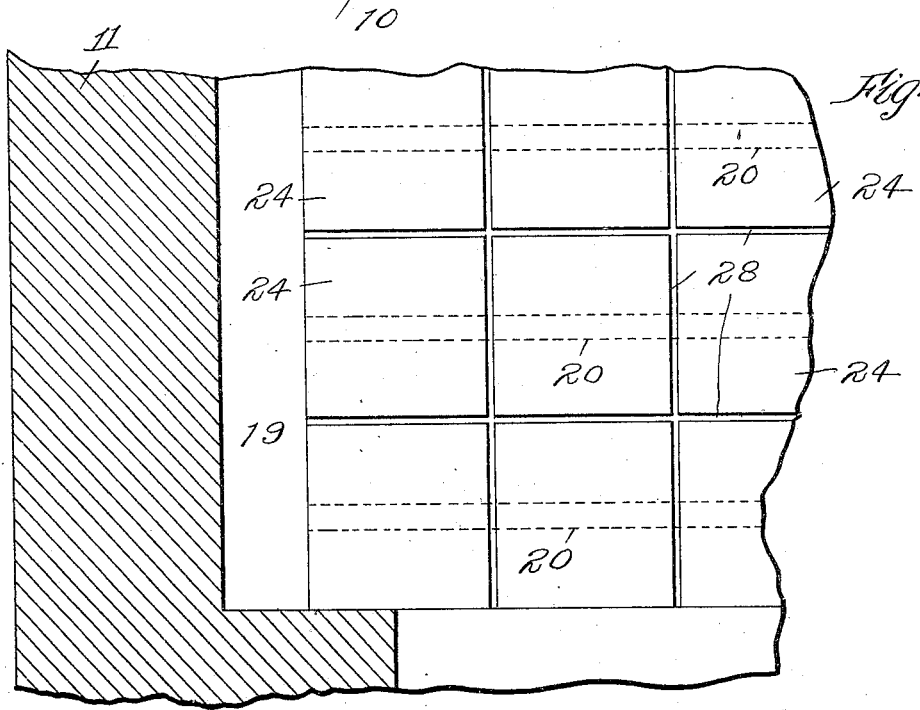

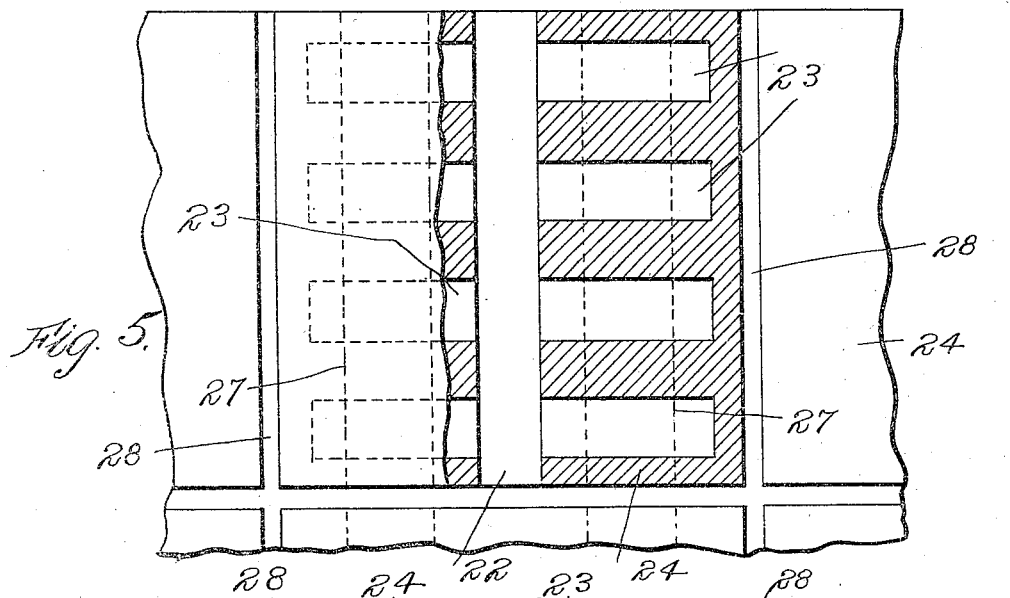
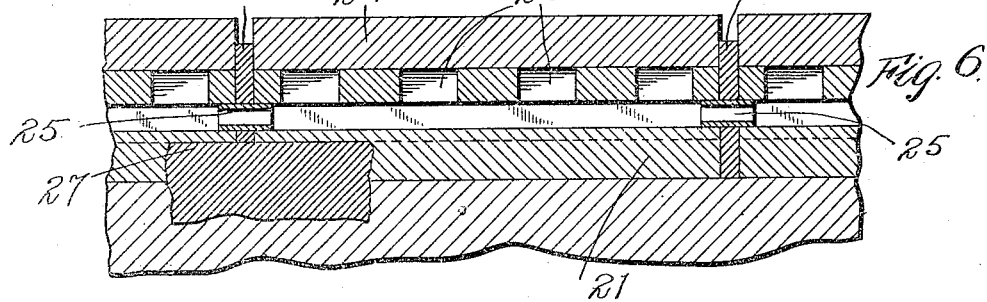
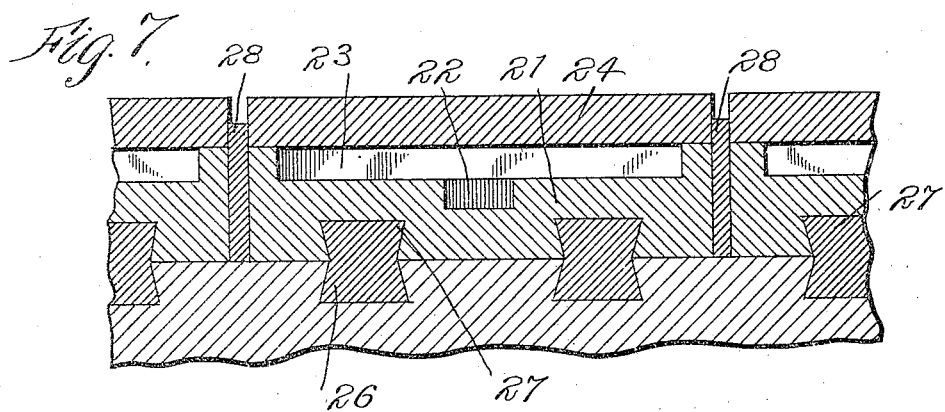

CHARLES S. BRADLEY, OF NEW YORK, N. Y.

CHEMICAL FILTER.

1,077,037.  Specification of Letters Patent.  Patented Oct. 28, 1913.

Application filed December 18, 1912. Serial No. 737,455.

*To all whom it may concern:*

Be it known that I, CHARLES S. BRADLEY, a citizen of the United States, residing in New York, borough of Manhattan, State of New York, have invented new and useful Improvements in Chemical Filters, of which the following is a full and clear specification.

My invention relates in general to the construction and operation of filters designed primarily with reference to the filtration of solutions. Such operations frequently involve the handling of chemical substances which attack any structural metal with which they come in contact. In the filtration of metallic solutions which are obtained in wet chemical processes for the concentration of ore values provision must be made for the removal of slimes which form the cake upon the filtering medium. Many proposals have been made for removing the cake from the filtering medium, usually by the employment of a current of compressed air or fluid in the reverse direction through the filtering medium whereby the cake is blown off. Such filters usually operate under the pressure or suction principle so that it is necessary that the filtering medium be provided with channels or passages through which the suction or pressure operates first to facilitate the passage of the solutions and second to provide for blowing off the cake.

Important objects of my invention are to provide a filter which is not injuriously affected by acid or other active solutions, to construct a filter so as to withstand the strains of pressure or suction which may be utilized in the operation of filtering or blowing off the cake, and to obtain an improved method of operating filters.

A further important object of my invention is to provide an improved filter brick construction.

Other objects and advantages of the invention will be apparent from the illustration and description in detail of a specific embodiment of the invention which will serve as an example of the principles involved.

It will be understood that the filter herein shown and described is intended to serve merely as an illustration of the essential principles which are the basis of my invention and that these principles may be varied and modified in numerous ways in applying the invention to other embodiments and applications thereof.

In the drawings, Figure 1 is a top plan view showing the general arrangement of a filter constructed in accordance with my invention; Fig. 2 is a longitudinal vertical section thereof with a filter car shown in diagram; Fig. 3 is a transverse vertical section of the filter shown in Fig. 1; Fig. 4 is a detail plan view of a corner of the filter bed with the end and side walls shown in section; Fig. 5 is a detail plan view, part in section showing a filter brick with the pressure and suction passageway and the distribution chambers communicating therewith; Fig. 6 is a vertical section of the same taken transversely of the filter; Fig. 7 is a vertical section of the same taken longitudinally of the filter.

The filter comprises the foundation 10 with the side walls 11 and 12 and an end wall 13, all of which are constructed with concrete. Wherever exposed to the solutions the filter may be lined with acid proof cement, as at 14. Such acid proof cement may be obtained for instance by mixing one part of sulfur with one part of sand and fusing the mass together. This particular cement while being employed by me is not in itself my own invention, and therefore I make no claim to the cement, *per se*, in this application. The cement is not acted upon by any of the solutions commonly met with in wet chemical processes for the concentration of ore values, whether they be acid or basic.

The side walls 11 and 12 have formed in them the supply troughs 15 and 16 which receive the solutions and gangue to be filtered from a trough 17, formed in the end wall 13 and deliver them through the ports 18 onto the filter bed. The foundation 10 is provided with longitudinal conduits 19 extending longitudinally of the filter beneath each of the side walls and these communicate with transversely extending pressure and suction passages 20 formed in the filter bricks as will be shown.

Each filter brick, as shown in detail in Figs. 5, 6 and 7 comprises an acid proof base 21, preferably constructed of the sulfur and sand cement referred to above and in which are formed the passageways 22, from which branch a plurality of pressure and suction distribution chambers 23. The upper portion of the brick is constructed of suitable porous material, such as silica sand forming the filtration portion 24. The base portion 21 and filtration portion 24 are fused together in any suitable way, as by a fused binder, for example, the sulfur of the base portion or they may be united in any other desired manner which is proof against chemical attack. The passages 22 extend entirely through the brick from one side to the other, whereas the chambers 23 as herein shown need not pass through the sides of the brick. In this way when the filter brick are laid on the foundation bed the passages 22 extend transversely across the filter, those of one brick communicating with those of another, as will be explained, while the chambers 23 are entirely local in their action and preferably do not extend from one brick to another. In assembling the bricks those at the sides of the filter have their passages 22 in communication with the main conduits 19 and metallic connecting sleeves 25 join the adjacent ports of the chambers 22 of adjacent bricks, so that communication from one brick to another transversely of the filter is maintained through the series of chambers 22.

For securing the bricks in place upon the foundation bed, the foundation bed is provided with transverse key spaces 26, and the base portion of the brick with key spaces 27, each of which is preferably undercut. Into these spaces which are preferably continuous transversely of the filter a thin binding cement may be run, which subsequently sets and locks each brick firmly in place upon the foundation. To facilitate the filling of the key spaces and for other purposes, which will appear, the filter bricks are not set snugly against each other, but are arranged with intermediate spaces around each brick and through these spaces the binding cement may be allowed to flow into the key spaces. These spaces are then allowed to partially fill with cement 28. The key spaces 26 and 27 terminate a short distance from the conduit 19 so that the cement does not flow into the latter. After the cement has set the top surfaces of the filter brick are ground off so as to form substantially flat continuous surfaces to facilitate the scraping operation employed in the removal of the cake, as will be described. It is for this reason that the cement filler 28 does not extend all the way to the top of the brick as the cement would interfere with the grinding operation.

As shown in Figs. 1, 2 and 3 I provide tracks or ways 29 and 30 on the side walls 11 and 12 of the foundation upon which runs a filter car 31, provided with a scraper 32, and the conveyers 33 and 34. In the operation of the filter a charge of solutions and gangue or other materials to be filtered is run on to the filter bed by way of the troughs 15, 16 and 17. Suction is then applied through the conduits 19 and the several passages and chambers in the filter bricks, whereby the filtration is caused to take place. The metal connections 25 which connect together the passages 22 of the several bricks are dissolved out by the action of the solutions, thus leaving continuous acid proof passages. For the removal of the cake, which is formed during the filtering operation the filter car 31 is run on to the filter and the scraper 32, which is adjusted to the proper elevation scrapes off all but a thin remnant of the cake, which remains next to the filter bricks. During the scraping operation the conveyer 33 elevates the cake and delivers it on to the cross conveyer 34, which may discharge it into a suitable receptacle. As the car reaches the end of the filter the scraper is automatically lifted from the filtering surface by the elevated portion of the track 30 so that the car can pass from one filter to another. After all but a remnant of the cake has been removed a new charge is run on and pressure is then applied through the conduit 19, whereby the remnant of cake is blown from the surface and the pores of the filter brick. This remnant of cake is thus thoroughly mixed with the new charge of solutions and the filter bed is in condition for another filtering operation.

The filter above described is suited to the filtration of solutions in general, but in cases where the solutions are especially active, as where compounds of elements of variable valency are present which would attack any of the ordinary constructional materials, the sulfur and sand cement which I have described is of particular importance. It will be seen that by this construction of the filter, the solutions and materials treated come in contact with only the silica brick of the filtering medium and the sulfur and sand cement, the lower non-porous portion of the filter brick and all surfaces exposed to the solutions being constructed of this cement.

What I claim is:

1. A chemical filter comprising in combination a foundation, filtering medium laid on said foundation, with a substantially continuous and flat outer surface and having interior chambers for pressure and suction, whereby pressure and suction are sustained upwardly and downwardly and displacing tendency of pressure and suction thus avoided, and means for communicating pressure and suction to said interior chambers.

2. A chemical filter comprising in combination a foundation, filter bricks laid on said foundation forming a substantially continuous and flat outer surface, and having interior chambers communicating from one brick to another, whereby pressure and suction are sustained upwardly and downwardy and the displacing tendency thereof avoided, and means for communicating pressure and suction to said interior chambers.

3. A chemical filter comprising in combination a system of filter bricks formed and arranged to provide a substantially continuous and flat filtering surface, each filter brick having interior chambers in communication with the chambers of adjacent bricks for sustaining suction and pressure upwardly and downwardly, whereby the displacing tendency of the pressure or suction is substantially avoided, means for communicating pressure and suction to the interior chambers of the bricks and means for supplying material to be treated to the filtering surface.

4. A chemical filter comprising in combination a system of filter bricks having interior chambers for distributing pressure and suction within the individual bricks and passages providing communication from one brick to another, and means for communicating pressure and suction to said passages.

5. A chemical filter comprising in combination a foundation having a conduit therein, and filter bricks on said foundation, having interior chambers in communication with said conduit.

6. A chemical filter comprising in combination a foundation having a conduit therein, and filter bricks on said foundation having interior chambers for distributing pressure and suction within the bricks and passages providing communication between said chambers and said conduit.

7. A chemical filter comprising in combination a foundation having key spaces, a system of filter bricks on said foundation having key spaces in registry with the key spaces of the foundation, and filling material in said key spaces, forming keys by which the bricks are secured to the foundation.

8. A chemical filter comprising in combination a concrete foundation having key spaces, a system of filter bricks having non-porous bases with key spaces, disposed on said foundation with their key spaces in registry with the key spaces of said foundation and a cement filling in said key spaces forming keys by which the bricks are secured to the foundation.

9. An acid proof filter comprising in combination a concrete foundation having a conduit, of acid proof cement lining upon the walls of said conduit and on the other portions of said foundation exposed to the materials filtered and a system of filter bricks disposed on said foundation having acid proof non-porous bases and chambers in communication with said conduit.

10. A filter brick comprising in combination a porous filtering portion and a non-porous acid proof base provided with chambers in communication with said porous filtering portion.

11. A filter brick comprising in combination a porous filtering portion and a non-porous base provided with chambers in communication with said porous filtering portion.

12. An acid proof filter brick comprising in combination a porous filtering portion and a non-porous acid proof base, said base having a fluid passage and interior chambers in communication therewith for distributing pressure and suction to said porous filtering portion.

13. An acid proof filter brick comprising in combination a porous filtering portion and a non-porous base, said base having a fluid passage and interior chambers in communication therewith for distributing pressure and suction to said porous filtering portion.

14. In a filter, the combination with a plurality of filter members having fluid passages through them, a temporary metallic connection forming a temporary communication from the passage of one member to that of another, and a permanent acid proof body around said temporary connection.

CHARLES S. BRADLEY.

Witnesses:
GEORGE P. WELLCOME,
KATHERINE LYONS.

Copies of this patent may be obtained for five cents each, by addressing the "Commissioner of Patents, Washington, D. C."